United States Patent
Ji et al.

(10) Patent No.: US 8,135,895 B2
(45) Date of Patent: Mar. 13, 2012

(54) VIRTUAL SATA PORT MULTIPLIER, VIRTUAL SATA DEVICE, SATA SYSTEM AND DATA TRANSFER METHOD IN A SATA SYSTEM

(75) Inventors: Yung-Li Ji, Hsinchu (TW); Chin-Nan Yen, Hsinchu (TW); Fu-Ja Shone, Hsinchu (TW)

(73) Assignee: Skymedi Corporation, Hsinchu (TW)

( * ) Notice: Subject to any disclaimer, the term of this patent is extended or adjusted under 35 U.S.C. 154(b) by 208 days.

(21) Appl. No.: 12/073,283

(22) Filed: Mar. 4, 2008

(65) Prior Publication Data
US 2009/0106472 A1 Apr. 23, 2009

(30) Foreign Application Priority Data
Oct. 18, 2007 (TW) .................... 96139057 A

(51) Int. Cl.
*G06F 13/12* (2006.01)
*G06F 13/14* (2006.01)
(52) U.S. Cl. .......................... 710/305; 710/74
(58) Field of Classification Search ............ 710/62, 710/74
See application file for complete search history.

(56) References Cited

U.S. PATENT DOCUMENTS

| | | | | |
|---|---|---|---|---|
| 6,751,761 B1* | 6/2004 | Tendo | ............................ | 714/716 |
| 7,219,191 B2* | 5/2007 | Takamoto et al. | ............ | 711/112 |
| 7,496,703 B2* | 2/2009 | Tee et al. | ........................ | 710/74 |
| 7,539,797 B2* | 5/2009 | Nemazie et al. | ................ | 710/74 |
| 2005/0138258 A1* | 6/2005 | Seto | ............................... | 710/301 |
| 2007/0005838 A1* | 1/2007 | Chang et al. | ..................... | 710/62 |
| 2007/0050538 A1* | 3/2007 | Northcutt et al. | ............. | 711/112 |
| 2008/0164321 A1* | 7/2008 | Lin | ................................. | 235/486 |
| 2008/0222354 A1* | 9/2008 | Wang | ............................. | 711/114 |
| 2008/0279382 A1* | 11/2008 | Chen et al. | ..................... | 380/277 |

OTHER PUBLICATIONS

Serial ATA International Organization, "Serial ATA Revision 2.5", Oct. 27, 2005, pp. 1-594.*
Cisco Systems, Cisco IOS Interface Configuration Guide: Confguring Logical Interfaces, May 17, 2007, p. 135-146.*
InfoCellar.com, "The OSI (Open System Interconnection) Model", Mar. 13, 2005, p. 1-7, Document archived using: www.archive.org, http://web.archive.org/web/20050313175007/http://www.infocellar.com/networks/osi-model.htm.*
Frenzel, Louis E., "Multiplier Chips and Port Selector Implement Efficient SATA Interfaces", Electronic Design Apr. 13, 2006: ED Online ID #12275, Copyright 2006Penton Media, Inc. http://www.exar.com/assets/0/22/64/bb433a106d1c41b2a3a3ee60ae68d336.pdf.*

* cited by examiner

*Primary Examiner* — Tariq Hafiz
*Assistant Examiner* — Dayton Lewis-Taylor
(74) *Attorney, Agent, or Firm* — Rosenberg, Klein & Lee

(57) ABSTRACT

A virtual SATA port multiplier and a virtual SATA device are provided for a SATA system. The virtual SATA port multiplier uses a SATA physical layer for data transfer between it and a SATA host, and a non-physical layer for direct data transfer between it and the virtual SATA device. Since the data transfer between the virtual SATA port multiplier and the virtual SATA device is not carried out by way of SATA physical layers, no physical layer circuits are required accordingly, thereby reducing the manufacturing cost, power consumption and hardware size of the SATA system.

25 Claims, 9 Drawing Sheets

VIRTUAL SATA PORT MULTIPLIER, VIRTUAL SATA DEVICE, SATA SYSTEM AND DATA TRANSFER METHOD IN A SATA SYSTEM

FIELD OF THE INVENTION

The present invention is related generally to the Serial Advanced Technology Attachment (SATA) data link interface and, more particularly, to the data transfer without through SATA physical layers in a SATA system.

BACKGROUND OF THE INVENTION

The SATA international organization defines a SATA data link interface which includes, from the bottom to the top in the communication architecture, a physical layer, a link layer, a transport layer, a command layer and an application layer. Sometimes the command layer and the application layer are combined into a single layer, known as a command and application layer or a command/application layer, or simply an application layer. The application layer is responsible for overall ATA command execution, including controlling Command Block Register accesses. The transport layer is responsible for placing control information and data to be transferred between a host and a device in a packet/frame, known as a Frame Information Structure (FIS). The link layer is responsible for taking data from the constructed frames, encoding or decoding each byte using 8b/10b, and inserting control characters such that the 10-bit stream of data may be decoded correctly. The physical layer is responsible for transmitting and receiving the encoded information as a serial data stream on the wire. For more details, readers are referred to "Serial ATA Specification, Rev. 2.5" and "AT Attachment with Packet Interface-6 (ATA/ATAPI-6)".

FIG. 1 illustrates the data transfer scheme in a SATA system which includes a SATA device to be accessed by a SATA host through a SATA port multiplier. After the SATA host gives a standard ATA command, data is transferred from the command and application layer 100 to the SATA port multiplier first, through the transport layer 102, the link layer 104 and the physical layer 106. The physical layer 106 of the SATA host transfers the data to the physical layer 112 of the SATA port multiplier by a SATA physical layer signal, and in the SATA port multiplier the data is further transferred from the physical layer 112 up to the transport layer 108 through the link layer 110. As is well known, a SATA host is capable of accessing to up to fifteen SATA devices via a SATA port multiplier, and for which the transport layer of the SATA port multiplier will read the PM port field in the FIS in order to determine the target SATA device to receive the data. After determines the target SATA device, the transport layer 108 of the SATA port multiplier further transfers the data through the link layer 110 to the physical layer 112, and the physical layer 112 transfers the data to the physical layer 120 of the SATA device by a physical layer signal. Then, in the SATA device, the data is further transferred to the command and application layer 114 through the link layer 118 and the transport layer 116. As shown in FIG. 1, in a SATA system, the SATA port multiplier and the SATA device both are required to have a respective physical layer for data transfer between the SATA host and the SATA port multiplier, and between the SATA port multiplier and the SATA device, by SATA physical layer signals.

FIG. 2 shows a standard SATA card reader 200 plugged to a SATA host 202, in which for communications over the SATA architecture, the SATA host 202 needs a SATA physical layer circuit 204, and the SATA port multiplier 208 of the card reader 200 also needs a SATA physical layer circuit 210, with a SATA interface 206 therebetween. In the card reader 200, for data transfer between the SATA port multiplier 208 and two SATA devices 216 and 226, the SATA port multiplier 208 further needs two SATA physical layer circuits 212 and 214, and the SATA devices 216 and 226 also need SATA physical layer circuits 220 and 230 respectively. When the SATA host 202 accesses to the SATA device 216 or 226, the data sent out from the SATA physical layer circuit 204 of the SATA host 202 is received by the SATA physical layer circuit 210 of the SATA port multiplier 208 through the SATA interface 206. Then, the SATA port multiplier 208 determines to transfer the data to the SATA device 216 or 226 according to the PM port field in the FIS, and either the SATA physical layer circuit 212 or 214 is selected to receive the data depending on which one of the SATA devices 216 and 226 is determined to be the target SATA device. In the SATA device 216, a SATA controller 218 is used to receive the data through the SATA physical layer circuit 220, and a memory card controller 222 is used to read from or write to a memory card connected to a memory card connecting interface 224 according to the output of the SATA controller 218. Likewise, in the SATA device 226, a SATA controller 228 is used to receive the data through the SATA physical layer circuit 230, and a memory card controller 232 is used to read from or write to a memory card connected to a memory card connecting interface 234 according to the output of the SATA controller 228. As illustrated in FIG. 1, the SATA port multiplier 208 and the SATA devices 216 and 226 all employ a SATA physical layer to transmit and receive data, and thus, as shown in FIG. 2, all input and output performed by the SATA port multiplier 208 rely on the SATA physical layer circuits 210, 212, 214, 220 and 230 to transmit and receive the data. The card reader 200 accommodates two memory cards, and therefore three SATA physical layer circuits 210, 212 and 214 are required in the SATA port multiplier 208 for transmitting and receiving data, and two SATA physical layer circuits 220 and 230 are required in the SATA devices 216 and 226 for transmitting and receiving data. As a result, the card reader 200 has to be equipped with five SATA physical layer circuits 210, 212, 214, 220 and 230. In this manner, for a SATA card reader capable of reading a number n of memory cards, a number 2n+1 of SATA physical layer circuits are required for data transfer.

Therefore, a need exists for a SATA system with reduced SATA physical layer circuits, in order to reduce the manufacturing cost, the power consumption and the hardware size.

SUMMARY OF THE INVENTION

Accordingly, it is an object of the present invention to provide a SATA port multiplier, a SATA device and a SATA system so as to reduce the required SATA physical layer circuits.

It is also an object of the present invention to provide a data transfer method in a SATA system with less SATA physical layer circuits.

According to the present invention, a virtual SATA port multiplier and a virtual SATA device carry out data transfer therebetween without through any SATA physical layers. Preferably, the virtual SATA port multiplier and the virtual SATA device are integrated on a same chip or arranged on a same printed circuit board, and the virtual SATA device does not have a SATA physical layer. The SATA port multiplier still has a SATA physical layer for data transfer between it and a SATA host by a physical layer signal, but carries out data transfer between it and the virtual SATA device by a non-physical layer signal through a SATA non-physical layer over the SATA physical layer. In the virtual SATA port multiplier, a link layer or a transport layer is selected to be the SATA non-physical layer for direct data transfer between the virtual SATA port multiplier and the virtual SATA device. In the virtual SATA device, the SATA non-physical layer for direct data transfer between the virtual SATA device and the virtual SATA port multiplier is a link layer, a transport layer or a command and application layer.

A SATA system according to the present invention communicates with a SATA host as the SATA specification defines. However, in the SATA system, direct data transfer is carried out between a virtual SATA port multiplier and a virtual SATA device by way of SATA non-physical layers, but not SATA physical layers, and hence the required SATA physical layer circuits in the SATA system is reduced, thereby reducing the manufacturing cost, the power consumption and the hardware size.

A data transfer method in a SATA system according to the present invention carries out direct data transfer between a first non-physical layer over a SATA physical layer and a second non-physical layer not over the SATA physical layer by a non-physical layer signal.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAIL DESCRIPTION OF THE INVENTION

Figure 3:
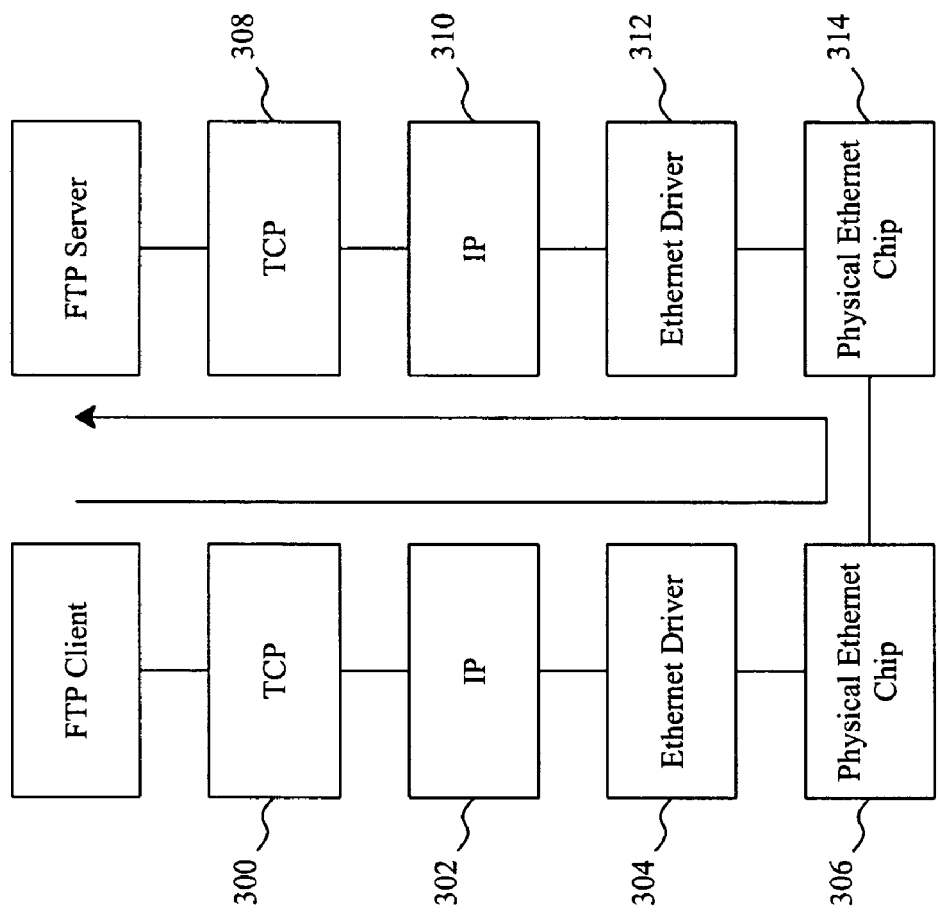
FIG. 3 shows the communication scheme in a Linux Ethernet system including a standard FTP client connected to a standard FTP server.
Figure 4:
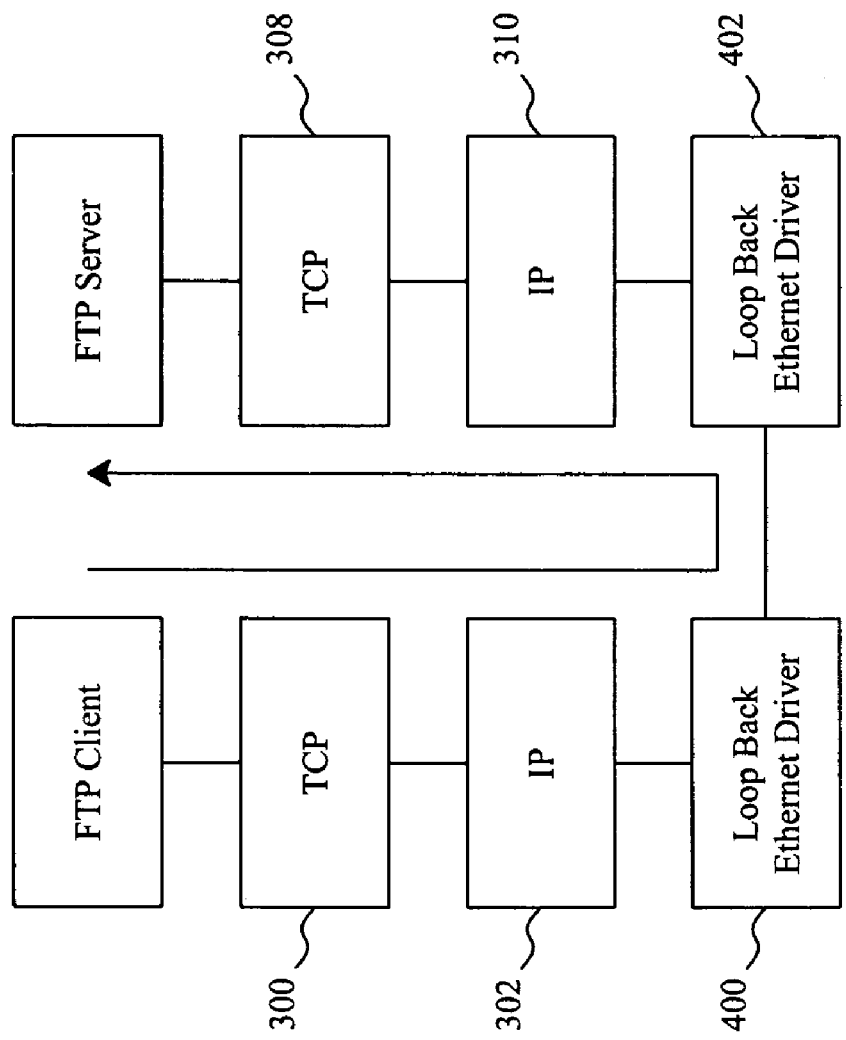
FIG. 4 shows an alternative communication scheme if a FTP client and a FTP server both are set on a same personal computer.

As to the network technology, some approaches have been provided for removing some particular layers from a multiple-layer software and hardware architecture without influencing data transmission in a system. FIG. 3 shows a Linux Ethernet system which includes a standard FTP client connected to a standard FTP server, and FIG. 4 shows an alternative communication scheme if the FTP client and the FTP server both are set on a same personal computer. As shown in FIG. 3, the data transmission between a standard FTP client and a standard FTP server is achieved through the TCP layer 300, IP layer 302, Ethernet driver 304 and physical Ethernet chip 306 of the FTP client, and the physical Ethernet chip 314, Ethernet driver 312, IP layer 310 and TCP layer 308 of the FTP server. Yet, if the FTP client and the FTP server are set on a same personal computer, the Ethernet chips 306 and 314 as well as the physical Ethernet signals may be cancelled. Instead, a loop back is configured in the Ethernet drivers 304 and 312 so as to form loop back Ethernet drivers 400 and 402, as shown in FIG. 4.

Figure 5:
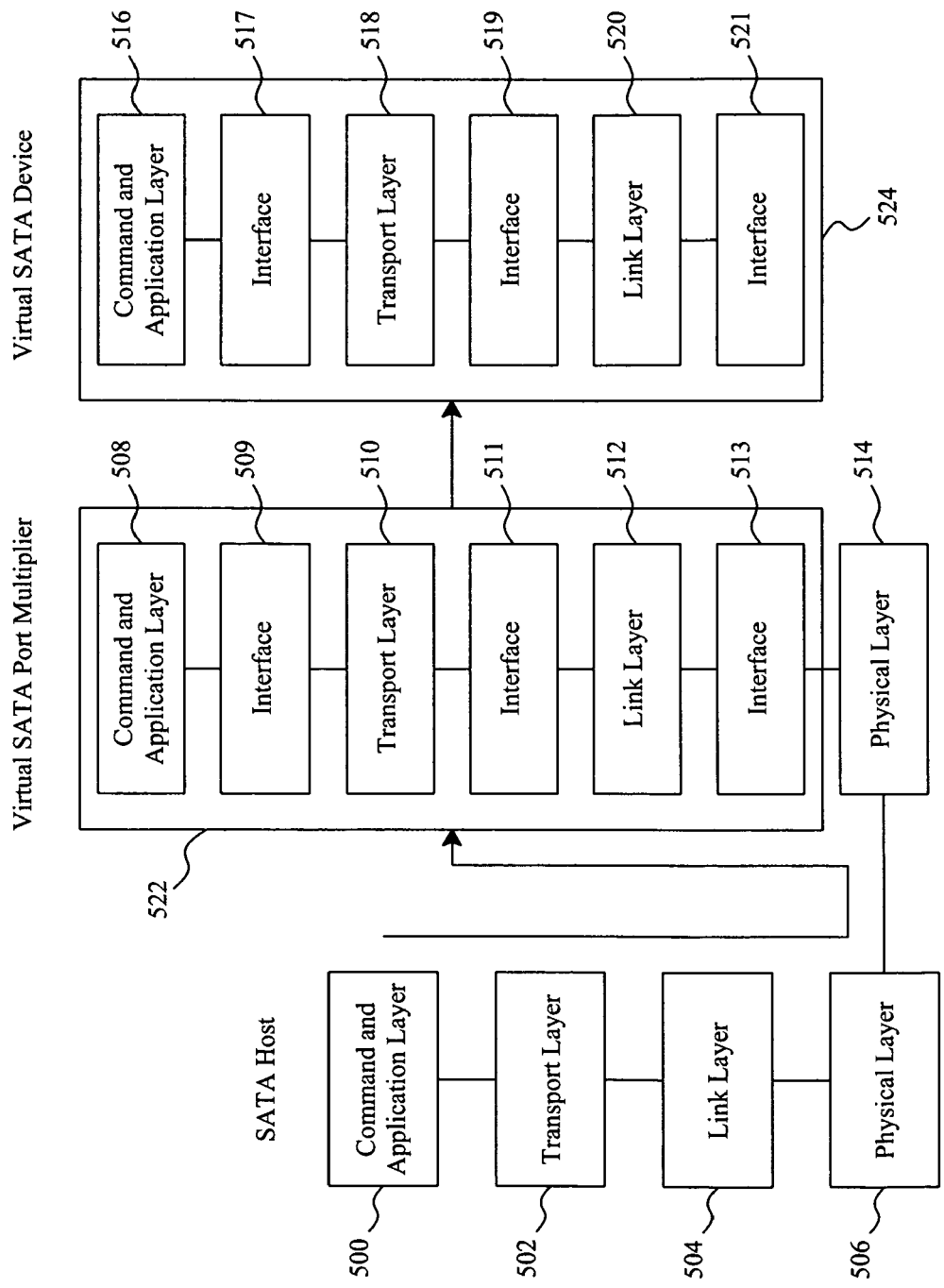
FIG. 5 shows a direct data transfer scheme in a SATA system according to the present invention.

The SATA physical layers may not be required between a SATA port multiplier and a SATA device for data transfer therebetween, in particular, when they are integrated on a same chip or arranged on a same printed circuit board. FIG. 5 shows a direct data transfer scheme between a SATA port multiplier and a SATA device according to the present invention. In this system, the SATA port multiplier and the SATA device carry out data transfer therebetween without through any SATA physical layers, and for this reason they are called virtual SATA port multiplier and virtual SATA device. For more details, the interfaces for the SATA layers in the virtual SATA port multiplier and the virtual SATA device are also shown in FIG. 5. The virtual SATA port multiplier still has a SATA physical layer 514 for data transfer between it and a SATA host, and the communications therebetween is the same as the SATA specification defines. After the SATA host gives a standard ATA command, data is transferred from the command and application layer 500 to the virtual SATA port multiplier through the transport layer 502, the link layer 504 and the SATA physical layer 506 of the SATA host, and the SATA physical layer 506 of the SATA host transfers the data to the SATA physical layer 514 of the virtual SATA port multiplier. In the virtual SATA port multiplier, as for data transfer over a standard SATA architecture, the data received by the SATA physical layer 514 is transferred up to the transport layer 510 through the link layer 514, and the transport layer 510 determines to transfer the data to which SATA device according to the PM port field in the FIS. However, after the target SATA device is determined, the data transfer between the virtual SATA port multiplier and the virtual SATA device is accomplished directly by way of a non-physical layer signal. In the virtual SATA port multiplier, one non-physical layer in the upper layers 522 over the SATA physical layer 514 is selected for the data transfer between the SATA port multiplier and the virtual SATA device by the non-physical layer signal, and a corresponding non-physical layer in the upper layers 524 of the virtual SATA device is selected for this data transfer. Therefore, the virtual SATA device needs no SATA physical layer, and in the hardware circuit, no physical layer circuits are required for data transmission and receiving between the virtual SATA port multiplier and the virtual SATA device. To a time-proven reliable SATA device, the improvement for the reduction of manufacturing cost, power consumption and hardware size can be achieved by simply removing the SATA physical layer circuits in the hardware and without any change to the software. Therefore, time and resources consumed by repeated verification can be saved.

Figure 6:
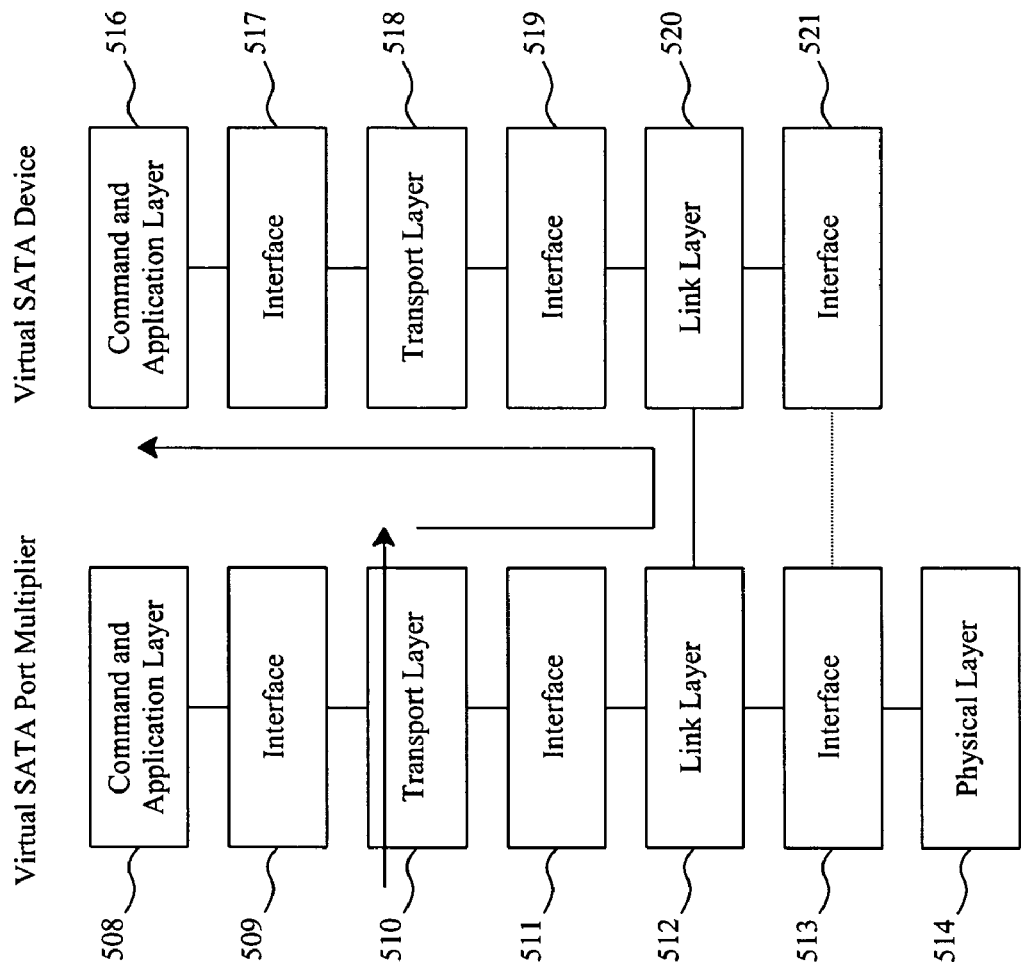
FIG. 6 shows a first method for direct data transfer between a virtual SATA port multiplier and a virtual SATA device according to the present invention.
Figure 7:
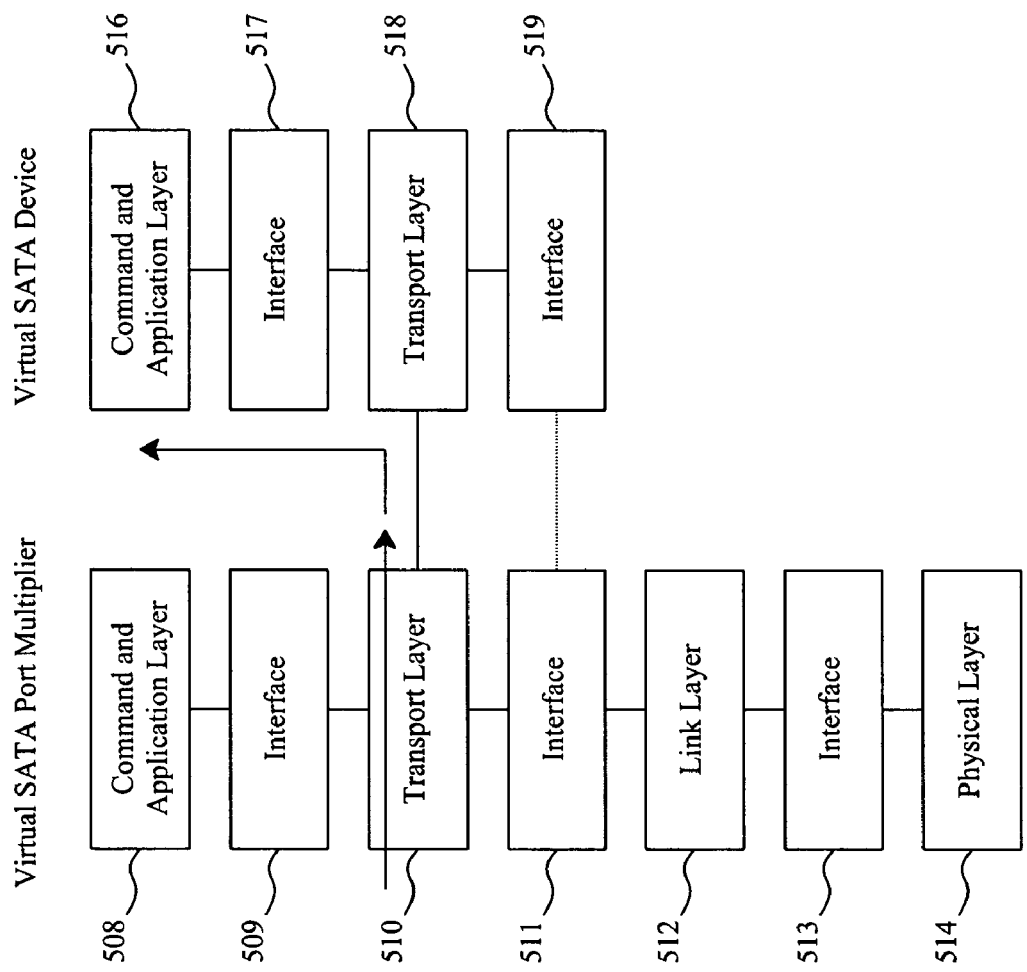
FIG. 7 shows a second method for direct data transfer between a virtual SATA port multiplier and a virtual SATA device according to the present invention.
Figure 8:
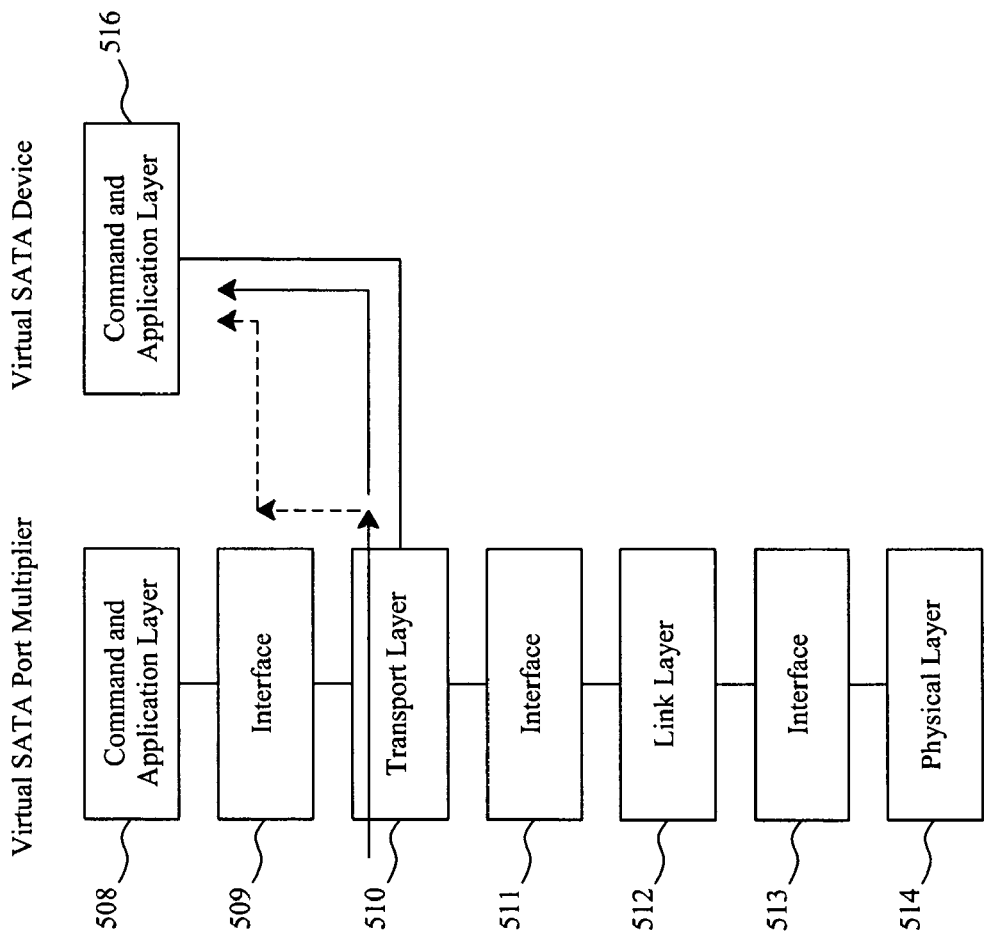
FIG. 8 shows a third method for direct data transfer between a virtual SATA port multiplier and a virtual SATA device according to the present invention.

As shown in FIG. 6, the link layer 512 of the virtual SATA port multiplier and the link layer 520 of the virtual SATA device are selected for direct data transfer between the virtual SATA port multiplier and the virtual SATA device, and the non-physical layer signal for this direct data transfer is the link layer signal. Alternatively, the link layer signal may be sent through the interfaces 513 and 521 as indicated by the dotted line, since the interfaces 513 and 521 may have the link layer signal or others to be converted into the link layer signal. FIG. 7 shows another embodiment, in which the virtual SATA device does not have a physical layer and a link layer, and the non-physical layer signal for direct data transfer between the virtual SATA port multiplier and the virtual SATA device is the transport layer signal that is sent directly between the transport layers 510 and 518, or between the interfaces 511 and 519 instead, as the dotted line indicates. FIG. 8 provides a further embodiment, in which the non-physical layer signal for direct data transfer between the virtual SATA port multiplier and the virtual SATA device is also the transport layer signal, but is sent from the transport layer 510 directly or through the interface 509 to the command and application layer 516 of the virtual SATA device. If the proven reliable software and hardware are not taken into consideration, the most cost-effective and reasonable way to construct a new SATA device is to make the transport layer 510 of the virtual SATA port multiplier read the PM port field in the data directly. When the PM port field indicates that the data are to be transferred to the virtual SATA port multiplier, the transport layer 510 transfers the data to the command and application layer 508 of the virtual SATA port multiplier. When the PM port field indicates that the data are to be transferred to the virtual SATA device, the transport layer 510 transfers the data to the command and application layer 516 of the virtual SATA device. In this embodiment, the virtual SATA port multiplier and the virtual SATA device may use a same processor for dramatically reducing the complexity and cost. It would be understood that the direct data transfer between the virtual SATA port multiplier and the virtual SATA device is not limited to the cases shown in FIGS. 6-8. For instance, the data may be transferred from the transport layer 510 of the virtual SATA port multiplier to the command and application layer 516 of the virtual SATA device through the interface 517 in the virtual SATA device. As illustrated in the above embodiments, the more upper layer in the virtual SATA device is selected for data transfer between the virtual SATA port multiplier and the virtual SATA device, the more portion of the virtual SATA device is saved. For example, the virtual SATA device shown in FIG. 8 only needs the command and application layer 516. However, even for a standard SATA device which has the full four or five SATA layer structure, the present invention is also applicable, if one SATA non-physical layer in the SATA device is selected for direct data transfer between the SATA device and a virtual SATA port multiplier by a non-physical layer signal. In this case, the SATA device is also a virtual SATA device of the present invention, since it carries out direct data transfer by a non-physical layer signal through a SATA non-physical layer.

Although the data transfer from the SATA host to the virtual SATA device is detail illustrated in the above embodiments, it is obvious that the data transfer from the virtual SATA device to the SATA host can be easily deduced. In other embodiments, the interfaces 509, 511, 513, 517, 519 and 521 may be integrated in the corresponding SATA layers, i.e., the command and application layers, the transport layers and the link layers.

Figure 9:
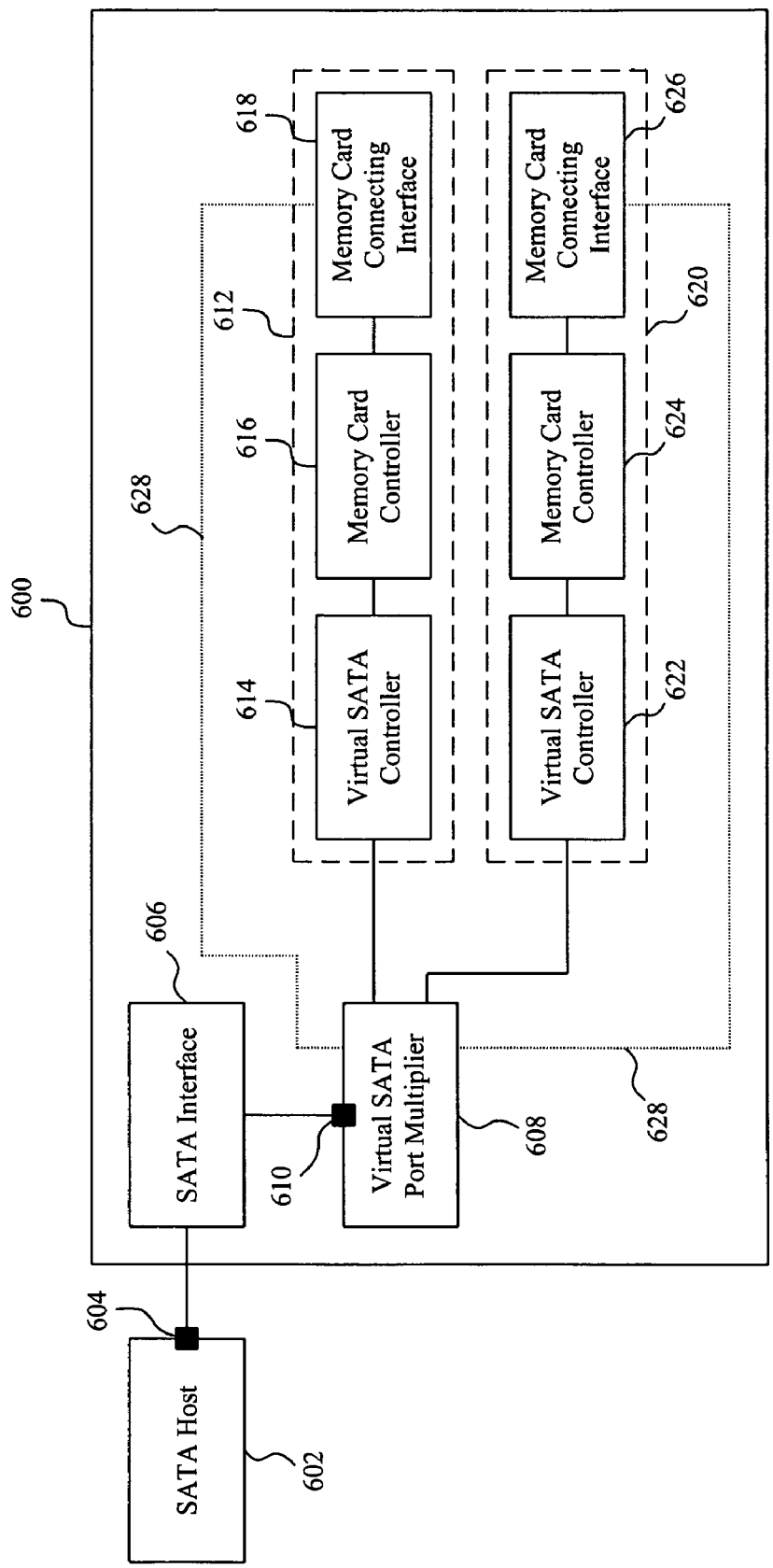
FIG. 9 is the block diagram of a SATA card reader according to the present invention.

For further details, FIG. 9 provides a card reader 600 employing a virtual SATA port multiplier 608 and two virtual SATA devices 612 and 620 according to the present invention. In this system, the data sent out from the SATA physical layer circuit 604 of a SATA host 602 is received by the SATA physical layer 610 of the virtual SATA port multiplier 608 through a SATA interface 606, as in a standard SATA system. However, since the virtual SATA port multiplier and the virtual SATA devices 612 and 620 directly transfer the data therebetween by non-physical layer signals, the virtual SATA port multiplier 608 needs no SATA physical layer circuits for data transfer to the virtual SATA devices 612 and 620, and the virtual SATA devices 612 and 620 also need no SATA physical layer circuits for data transfer from the virtual SATA port multiplier 608. In the virtual SATA device 612, a non-physical layer in a virtual SATA controller 614 is used to receive data directly from a non-physical layer in the virtual SATA port multiplier 608, and a memory card controller 616 is used to read from or write to a memory card connected to a memory card connecting interface 618 according to the output of the virtual SATA controller 614. In the virtual SATA device 620, a non-physical layer in a virtual SATA controller 622 is used to receive data from a non-physical layer in the virtual SATA port multiplier 608, and a memory card controller 624 is used to receive read from or write to a memory card connected to a memory card connecting interface 626 according to the output of the virtual SATA controller 622. After the virtual SATA port multiplier 608 determines to transfer the data to the virtual SATA device 612 or 620, the data are directly transferred to the non-physical layer of the virtual SATA device 612 or 620 from the non-physical layer of the virtual SATA port multiplier 608. In this manner, even for a SATA card reader capable of accommodating a number n of memory cards, merely one SATA physical layer circuit 610 is required for data transfer between the card reader 600 and the SATA host 602. Compared with a conventional card reader requiring 2n+1 physical layer circuits for accommodating n memory cards, the card reader 600 greatly reduces the SATA physical layer circuits, thereby reducing the manufacturing cost, the power consumption and the hardware size.

Figure 1:
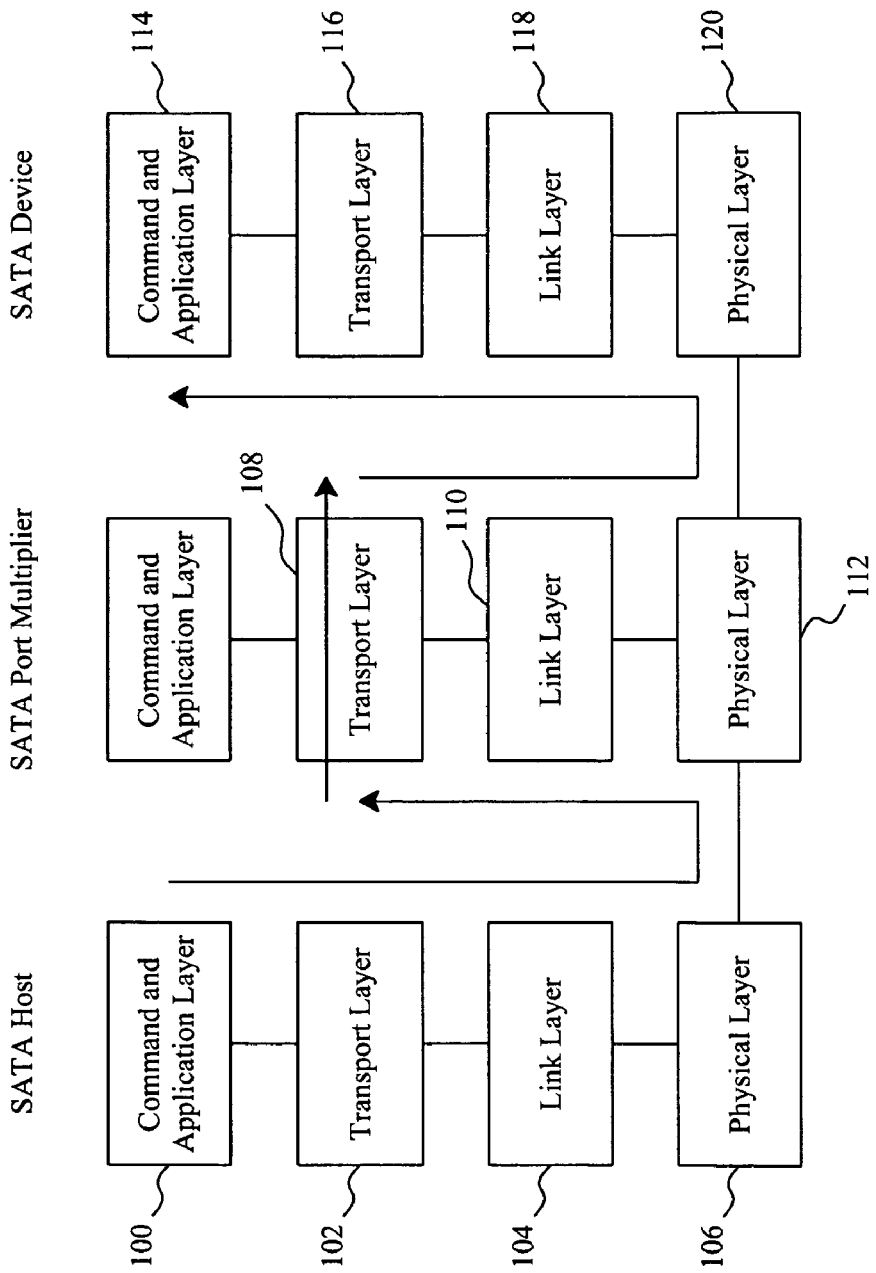
FIG. 1 shows the data transfer scheme in a standard SATA system.
Figure 2:
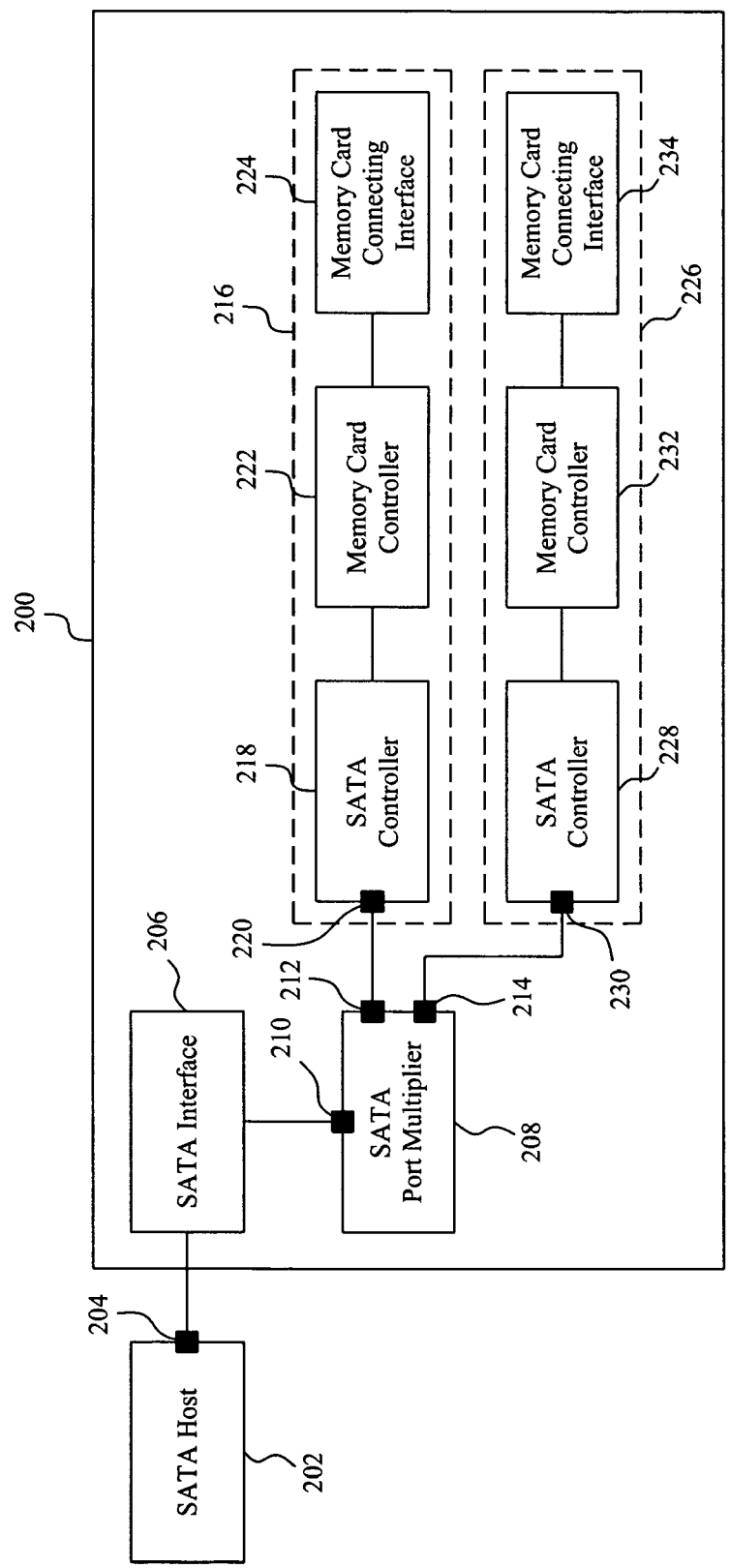
FIG. 2 is the block diagram of a standard SATA card reader.

The conventional card reader 200 of FIG. 2 could use the physical layer circuits 212, 214, 220 and 230 to report whether memory cards are inserted into the memory card connecting interfaces 224 and 234. In the card reader 600 of FIG. 9, the virtual SATA port multiplier 608 and the virtual SATA devices 612 and 620 can communicate about whether memory cards are inserted by detecting the register values in the memory card connecting interfaces 618 and 626, or by electrically coupling signals 628 from the memory card connecting interfaces 618 and 626 to the virtual SATA port multiplier 608. In some other embodiments, the virtual SATA port multiplier 608 may determine whether memory cards are inserted by detecting the register values in the memory card controllers 616 and 624 or the signals from the memory card controllers 616 and 624 to the virtual SATA port multiplier 608.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A virtual SATA port multiplier comprising:
    a physical layer for data transfer between the virtual SATA port multiplier and a SATA host outside the virtual SATA port multiplier by a physical layer signal; and
    a plurality of upper layers over the physical layer, wherein one of the upper layers performs direct data transfer with a corresponding upper SATA non-physical layer of a virtual SATA device outside the virtual SATA port multiplier by a non-physical layer signal.

2. The virtual SATA port multiplier of claim 1, wherein one of the upper layers is a transport layer, and the non-physical layer signal is a SATA transport layer signal.

3. The virtual SATA port multiplier of claim 2, further comprising an interface for interfacing to the transport layer, wherein the SATA transport layer signal is transmitted or received by the interface.

4. The virtual SATA port multiplier of claim 1, wherein one of the upper layers is a link layer, and the non-physical layer signal is a SATA link layer signal.

5. The virtual SATA port multiplier of claim 4, further comprising an interface for interfacing to the link layer, wherein the SATA link layer signal is transmitted or received by the interface.

6. A virtual SATA device comprising:
  a SATA non-physical layer for direct data transfer between the SATA non-physical layer and a corresponding SATA non-physical layer of a virtual SATA port multiplier outside the virtual SATA device by a non-physical layer signal.

7. The virtual SATA device of claim 6, wherein the SATA non-physical layer of the virtual SATA device is a link layer, and the non-physical layer signal is a SATA link layer signal.

8. The virtual SATA device of claim 7, further comprising an interface for interfacing to the link layer, wherein the SATA link layer signal is transmitted or received by the interface.

9. The virtual SATA device of claim 6, wherein the SATA non-physical layer of the virtual SATA device is a transport layer, and the non-physical layer signal is a SATA transport layer signal.

10. The virtual SATA device of claim 9, further comprising an interface for interfacing to the transport layer, wherein the SATA transport layer signal is transmitted or received by the interface.

11. The virtual SATA device of claim 6, wherein the SATA non-physical layer of the virtual SATA device is a command and application layer, and the non-physical layer signal is a SATA transport layer signal.

12. The virtual SATA device of claim 6, wherein the SATA non-physical layer of the virtual SATA device is a command and application layer.

13. The virtual SATA device of claim 12, further comprising an interface for interfacing to the command and application layer, wherein the non-physical layer signal is transmitted or received by the interface.

14. A SATA system comprising:
  a virtual SATA device having a first non-physical layer; and
  a virtual SATA port multiplier having a physical layer for data transfer between the virtual SATA port multiplier and a SATA host outside the SATA system, and a second non-physical layer over the physical layer for direct data transfer between the virtual SATA port multiplier and the first non-physical layer by a non-physical layer signal.

15. The SATA system of claim 14, wherein the virtual SATA device and the virtual SATA port multiplier are integrated on a chip.

16. The SATA system of claim 14, wherein the virtual SATA device and the virtual SATA port multiplier are arranged on a printed circuit board.

17. The SATA system of claim 14, wherein the virtual SATA device comprises:
  a virtual SATA controller having the first non-physical layer;
  a memory card connecting interface for being connected with a memory card; and
  a memory card controller connected to the virtual SATA controller and the memory card connecting interface, for reading from the memory card or writing to the memory card.

18. The SATA system of claim 17, wherein the virtual SATA port multiplier determines whether any memory card is connected to the memory card connecting interface according to a register value in the memory card connecting interface.

19. The SATA system of claim 17, wherein the virtual SATA port multiplier determines whether any memory card is connected to the memory card connecting interface according to a signal from the memory card connecting interface.

20. The SATA system of claim 17, wherein the virtual SATA port multiplier determines whether any memory card is connected to the memory card connecting interface according to a register value in the memory card controller.

21. The SATA system of claim 17, wherein the virtual SATA port multiplier determines whether any memory card is connected to the memory card connecting interface according to a signal from the memory card controller.

22. A data transfer method in a SATA system, comprising the steps of:
  (a) data transfer between a SATA physical layer in the SATA system and a SATA host outside the SATA system by a physical layer signal;
  (b) data transfer between the SATA physical layer and a first non-physical layer over the SATA physical layer; and
  (c) direct data transfer between the first non-physical layer and a second non-physical layer not over the SATA physical layer in the SATA system by a non-physical layer signal.

23. The method of claim 22, wherein the step (c) comprises the step of producing a link layer signal as the non-physical layer signal.

24. The method of claim 22, wherein the step (c) comprises the step of producing a transport layer signal as the non-physical layer signal.

25. The method of claim 22, wherein the step (c) comprises the step of producing the non-physical layer signal by command and application layer.

* * * * *